Patented July 22, 1941

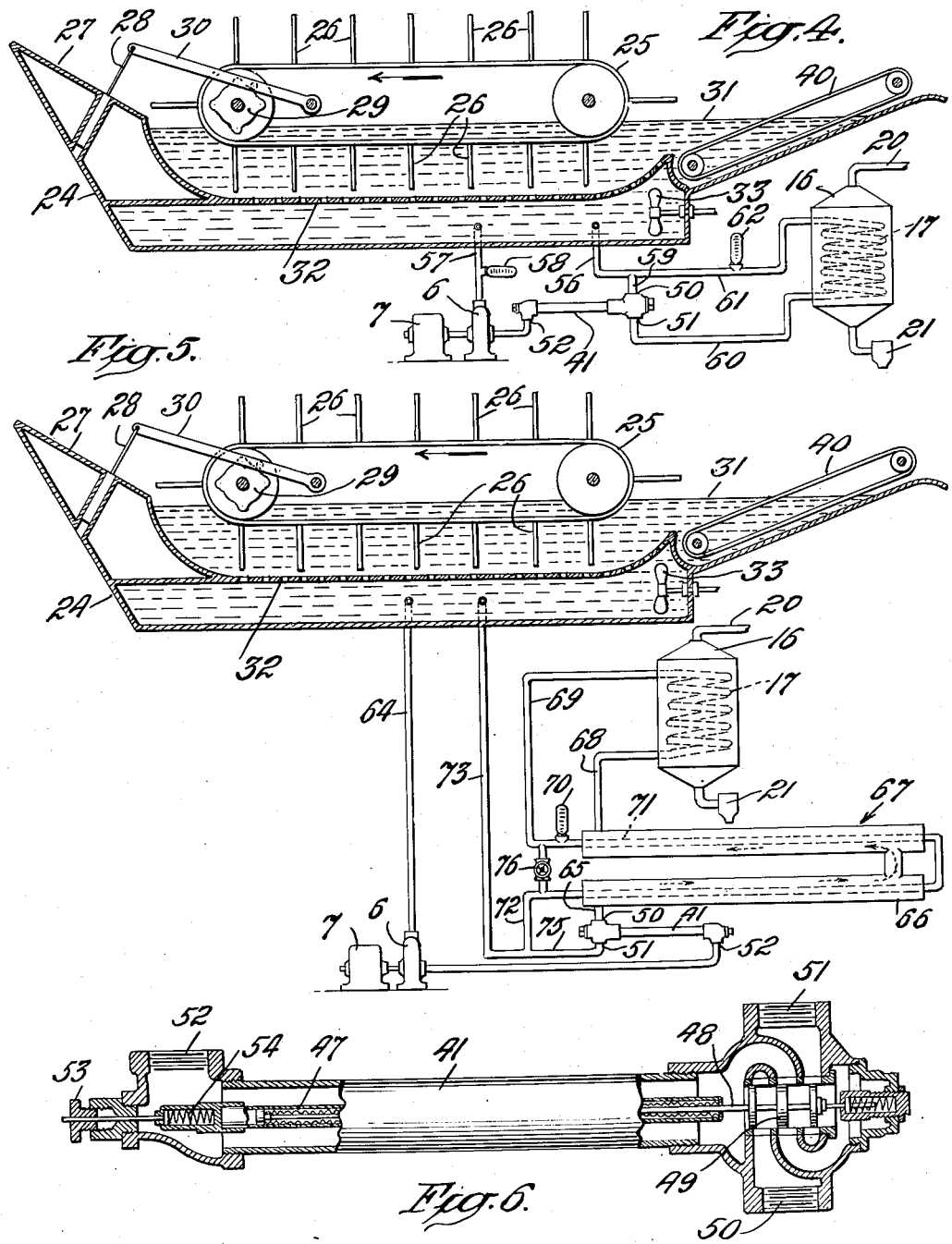

2,249,792

UNITED STATES PATENT OFFICE 2,249,792

METHOD AND APPARATUS FOR TREATING FRUIT

Bronson C. Skinner, Dunedin, Fla.

Application August 5, 1938, Serial No. 223,139

15 Claims. (Cl. 99—103)

This invention relates to a method and apparatus for treating fruit, particularly citrus fruit, and has for its object to provide an improved method and means for treating such fruit with liquids for a number of different purposes such as cleaning the fruit, enhancing their varietal color, or protecting them against decay organisms, whereby to improve their keeping qualities, appearance and saleability.

An important feature of the invention resides in the provision of a method and means for controlling the temperature and condition of fruit treating baths as used in packing houses, and for preventing the treating tanks from becoming infected with decay spores which originate in decayed fruit and rapidly infect the sound fruit and cause them to decay under ordinary methods of treatment.

One of the most important applications of the invention is in the artificial coloring of citrus fruits, such as oranges, tangerines and grapefruit; hence the coloring of such fruits will be used to illustrate the invention but not to limit its scope. It is well known that the color of citrus fruits is influenced by a great many factors, such as the character of the soil in which the fruit are raised, the intensiveness of cultivation and fertilization, climatic conditions, location of the fruit on the tree, etc. Citrus fruit which may be entirely satisfactory from the standpoint of flavor, juice content, etc. may at the same time be off color and therefore not as readily saleable as similar fruit which is more vividly colored. For this reason it is a common practice to color or dye the exterior surfaces of off-color citrus fruits for the purpose of enhancing their appearance and saleability.

The usual method of coloring citrus fruits is to spray or dip the fruit in a warm solution or emulsion of an oil-soluble dye, wash off the excess dye and then dry the fruit in any suitable manner. The efficiency of the dyeing solution varies inversely with the size of the color particles, that is, the smaller the color particles the greater the efficiency of the coloring baths or solutions in coloring the fruit. The standard method of preparing the color solution which is most commonly used in Florida, is to dissolve the dye such as "Yellow OB" or "Yellow AB", or "FMC 6", in an oil such as cocoanut oil, beef tallow or oleic acid. The quantity of dye dissolved in the oil can be varied to a considerable extent, but there is a certain concentration above which there is no improvement in the efficiency of the dye. In other words, a small amount of dye will produce some coloring effect, and an increase in the amount of dye will result in increasing the coloring effect up to a certain point, assuming a fixed temperature. Beyond this point there is no increase in efficiency and it is wasteful to add any further dye to the solution. After the optimum amount of dye is dissolved in the oil carrier the oil is converted into soap by the addition of a saponifying agent, such as potash.

The efficiency of a coloring solution such as that described above may be increased by the addition of various solvents, making it possible to color the fruit at a lower temperature than would otherwise be possible. A relatively small amount of a suitable solvent greatly increases the efficiency of the dye, but when a solvent is added to the coloring solution it is also necessary to add a certain amount of dye to the solvent. For example, in using a soap solution of dye containing no added solvent, or what is commonly termed a "hot" or high temperature color solution, if a solvent is added without additional dye the best results are not obtained. Therefore, it is first necessary to determine the saturation point of the dye used in the solvent, in other words the amount of dye that the solvent will carry at the particular temperature to be used in the coloring operation. For example, if the coloring operation is to be performed at a temperature of 110° F. it is first necessary to determine the amount of dye which the solvent will carry at that temperature and then add this amount of dye to the solvent before adding it to the coloring solution. Unless sufficient dye is employed the coloring solution will not be satisfactory or up to maximum efficiency, while if too much dye is employed it is simply wasted because it will crystallize out of the solution when cooled.

The usual solvents employed for increasing the efficiency of a coloring solution are volatile to some extent, and therefore the dye becomes more and more concentrated with the passage of time because of the evaporation of the solvent. However, offsetting this is the fact that the fruit removes a certain percentage of the dye and therefore tend to use up this excess. It therefore follows that, in using a solvent which is not very volatile and at the same time is easily saturated with dye, while using the solution to color fruits which naturally take up some of the dye, the amount of dye in the solvent rapidly drops below the saturation point and the solution becomes less efficient. Whether the plant is using a "high temperature" color solution without employing special solvents, as is usually the case when operating at temperatures from 120 to 135° F., or whether the plant is using a "low temperature" color solution employing special solvents which make it possible to operate at 110° F. and below, the same problem is presented, namely, that gradually, with time, the dye will crystallize out of the coloring solution as it cools.

As a typical example may be cited the case of a packing house which operates only in the day time and shuts down at night. The coloring tank is not held at a uniform temperature during the night, but is allowed to cool, whereupon dye crystals will form in the dye solution. These dye crystals, because of their large size, have very little efficiency in coloring the fruit; and the next morning, when the packing house resumes its operation and the temperature of the dye solution is raised to the operating point, these dye crystals do not go back into solution. As a result, the dye solution is not efficient because it does not contain a sufficient concentration of the small dye particles which do the work. These small dye particles will be partly in actual molecular solution in the solvent, or they will be in a fine colloidal state in the emulsion, but they will not exist in sufficient concentration to cause the dye to be transferred from the solution to the fruit; and the higher this concentration, the greater will be the tendency from the dye to enter upon the fruit.

I have now discovered that by heating the dye bath or solution to a temperature in the neighborhood of the boiling point, say 190° F. or higher, the large dye crystals can be thrown back into the fine colloidal form in which they are capable of being effectively transferred to the fruit; in fact I have found that temperatures higher than 190° F. are even better for this purpose, and as a general practice I have used temperatures as high as 240° F. However, I have also found that if the dye solution is heated to an elevated temperature such as 240° F., and then discharged into a tank or other vessel and allowed to cool slowly, dye crystals will form as the solution cools; but if the dye solution is cooled quickly from 240° F. down to the operating temperature of around 110° F. or thereabouts the formation of dye crystals is considerably reduced and the crystals which are formed are in a much more finely divided state, in fact the crystals are very minute and hardly visible to the naked eye. Such rapid cooling of the dye solution may be accomplished in various ways, as by passing it through a coil or pipe submerged in cold water or by discharging it into the tank containing the dye solution which is maintained at the operating temperature.

Accordingly, in carrying out my invention I continuously or repeatedly withdraw a relatively small amount of the dye solution from the coloring tank, heat it to an elevated temperature preferably of 190 to 240° F., and then return it to the coloring tank where the sudden contact with the relatively cool solution will quickly chill it to the operating temperature and thereby prevent the formation of large dye crystals. This raising of the temperature of the coloring solution to an elevated temperature, preferably 190° to 240° F., restores the coloring solution to the best form with practically all the dye particles in a finely divided state, either in molecular solution in the solvent or in a finely divided colloidal form in the emulsion.

Of course, the greater the amount of coloring solution withdrawn from the tank and returned thereto for sudden cooling, the better the condition of the tank for coloring purposes. Most of the coloring tanks used by pack-houses contain anywhere from 200 to 2000 gallons of coloring solution, so in withdrawing the coloring solution from a large tank and returning it at the rate of 5 gallons per minute it will take several hours before 95% of the solution has gone through the heating process. In thus continuously or repeatedly withdrawing the solution from the coloring tank and heating it to an elevated temperature, and returning the hot solution to the tank, the tendency is to maintain or raise the temperature in the tank. However, this is not objectionable because the cool fruit entering the tank would continuously cause the temperature of the solution to drop very rapidly if heat were not applied, and the practice is to keep the tank hot by means of steam coils or by means of steam plates which continuously heat the solution in the tank and maintain it at the desired temperature. In carrying out my invention, as hereinafter described, heating coils or plates may be employed to assist in maintaining the desired temperature of the solution in the coloring tank, but I prefer to employ a special method and apparatus whereby the solution withdrawn from the tank is heated under controlled conditions in such a way as to maintain any desired constant temperature in the coloring tank without the aid of any other heating means.

There are two general types of coloring units in use in the State of Florida. One of these, known as the "submerger" type, consists of a large tank of coloring solution into which the fruit are dumped and submerged by means of a traveling belt which holds the fruit beneath the coloring solution as they advance through the tank. At the same time the solution is constantly circulated over the fruit so that the solution in contact with the fruit is in constant motion and is therefore held at a constant and uniform temperature. In the other type of coloring unit, known as the "spray" or "flood" type, the solution is contained in a tank underneath a conveyor belt which carries the fruit forward over the tank on rollers. These rollers, constantly turning, cause the fruit to turn, and the coloring solution is continuously directed onto the fruit from above; in some cases the coloring solution is actually sprayed on the fruit through spray nozzles, while in other machines the solution flows over a perforated plate and drips down on the fruit more slowly, although in the case of both the "spray" and "flood" machines the principle is the same. When using the hot coloring solution in the submerger apparatus the preferred temperature is about 122° F., while in the "spray" or "flood" machines the temperature is preferably about 135° F., this difference in temperatures being explained by the fact that, due to space limitations, the fruit must go through the spray or flood machines more quickly than in the case of the submerger machine so that it is necessary to increase the temperature to get the same coloring effect. My invention may be applied equally well to these as well as other types of coloring units.

There is another important advantage in using my method of heating the coloring solution or liquid to an elevated temperature, preferably 190 to 240° F., and that is the sterilizing effect of the heat upon the coloring solution. All coloring tanks gradually become infected with decay spores, such as blue mold or stem-end rot, and, since the fruit are continuously passing through the coloring soution, the solution picks up the decay spores from the fruit. It is probable that most of these decay spores come from actually decayed oranges or other fruit which pass through the coloring tank in spite of every precaution which the packing house can take to keep them out. It is impossible for an operator to detect and remove every decayed orange on a grading belt preceding the coloring operation, even if he attempts to do so; but actually very few packing houses employ a grader ahead of the coloring solution and therefore the decayed fruit get into the coloring tanks in considerable quantities, with the result that they rapidly infect the tank with decay spores, whereupon the tank infects sound fruit with decay spores, causing them to decay.

Therefore my invention, using elevated temperatures to return the dye crystals to a finely divided state and likewise controlling the temperature of the coloring solution, has the further important advantage of continuously bringing the solution up to a sterilizing temperature which instantly kills the decay spores and continuously puts the solution in a sterile condition before it returns to the coloring tank. I have found from actual tests that, after operating a coloring tank according to my method for twenty-four hours, the solution in the tank will be practically sterile.

It will thus be seen that my invention as described above is useful not only in its application to coloring tanks, but also to other tanks or vessels used in fruit packing houses, such as the soaking tank which precedes the washer and is used to soften the dirt on fruit and assist the washer in the cleaning operation. Soaking tanks constitute a constant source of infection of sound fruit, due to the presence of decayed fruit which cannot readily be detected or excluded because of the covering of dirt which surrounds most of the fruit as they come from the groves, so it is particularly desirable to employ my heating and sterilizing method and equipment at this point in the packing plant. Furthermore, I have found that in the case of the borax tank, into which citrus fruits are ordinarily dipped to prevent decay, while the borax solution inhibits the growth of blue mold spores in the fruit itself, it does not actually destroy the spores which enter the borax tank with the rotten fruit, and it is therefore highly desirable to use my heating and sterilizing method and apparatus in connection with the borax tank.

Another feature of my invention resides in the provision of a special heat exchanger which utilizes some of the hot solution coming from the heater to raise the temperature of the solution which is about to pass through the heater. This heat exchanger, as hereinafter described, enables a larger amount of coloring solution to be passed through the heater and still not overheat the tank, which thereby still further increases the efficiency of the heating equipment.

These and other features and advantages of the invention will be described in greater detail in connection with the accompanying drawings, in which:

Fig. 4 shows a machine of the "submerger" type in which all the heating is performed outside the tank by means similar to that employed in Fig. 3;

Fig. 5 shows a machine similar to that of Fig. 4 equipped with a special heat exchanger in accordance with the invention;

Fig. 6 is a longitudinal sectional view of a liquid temperature controller or blender which may be employed in the apparatus of Figs. 3 to 5.

Figure 1:
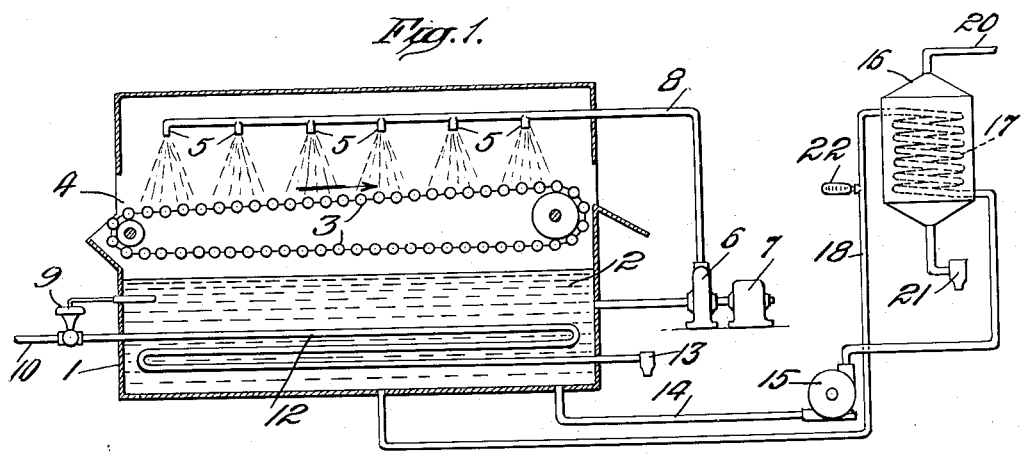
Fig. 1 is a diagrammatic view illustrating a "spray" type of coloring apparatus embodying the invention.

Fig. 1 shows a "spray" type of machine comprising a tank 1 containing a liquid 2, such as a coloring solution, above which is mounted a roller conveyor belt 3. The fruit enter the machine at the inlet 4, passing on to the belt 3, and are carried forward through the machine under the spray nozzles 5. The nozzles 5 spray the coloring solution over the fruit which are constantly turned by the rollers on conveyor belt 3, the coloring solution then draining down into the tank 1.

The solution is constantly withdrawn from the tank by a pump 6 operated by motor 7 and forced into pipe 8 which distributes the solution to the spray nozzles 5. The tank is kept partially full of the solution and the temperature is maintained constant by means of a temperature controller 9 on the steam inlet 10 leading to the heating coil 12 which is mounted in the tank and is provided at its opposite end with a suitable steam trap 13.

In accordance with my invention a portion of the solution is continuously withdrawn from tank 1 through pipe 14 by pump 15 and passed through a heater 16. The pump 15 serves to pump a portion of the coloring solution out of the tank 1, forcing it through the coil 17 of heater 16, and then returning it to the tank 1 through return pipe 18. The coil 17 is kept hot by being surrounded by steam which enters the heating unit through pipe 20, the condensed steam being automatically drawn off by steam trap 21. By pumping too much solution through coil 17 the temperature of the solution leaving the heater might possibly be below the desired temperature, which is preferably about 240° F., and I prevent this by inserting a thermometer 22 in the return pipe 18 so that the temperature of the solution leaving the heater may be determined and maintained at the desired point.

Figure 2:
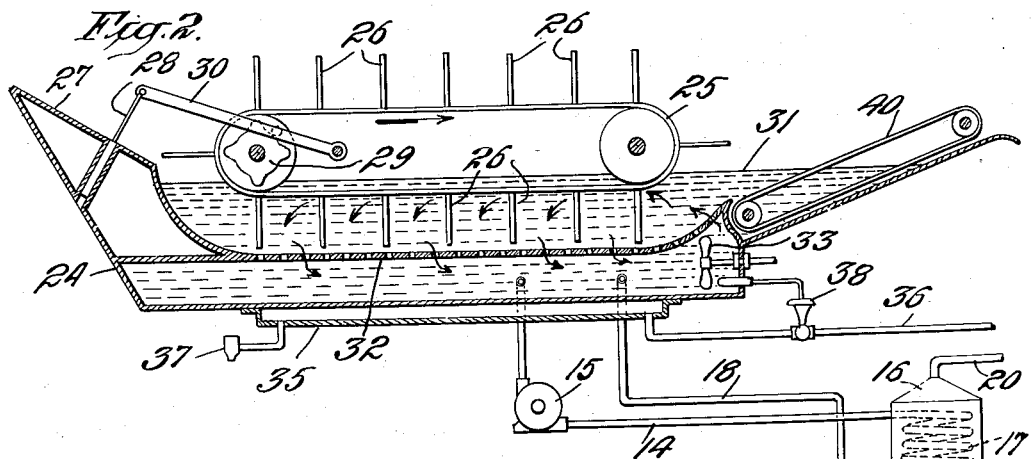
Fig. 2 is a similar view of a system operating on the "submerger" principle.

Fig. 2 shows a machine of the "submerger" type, comprising an elongated tank 24 containing a moving submerger belt 25 carrying a plurality of spaced paddles 26 which propel the fruit through the tank. The fruit enter the tank at the point 27 through a gate 28 which is operated by a cam 29 and lever 30 to raise the gate 28 so as to avoid crushing the fruit as the paddles 26 pass over the point where the fruit enter the solution. The water-line of the solution is indicated at the point 31 which is slightly above the lower course of the belt 25. The submerger tank is provided with a false bottom 32 which is suitably perforated so that the solution, which flows in the direction of the arrows, will pass down through the fruit which are below the belt 25. A propeller wheel 33 is mounted beneath the false bottom 32 and serves to cause a rapid circulation of the solution through the perforated bottom at any desired rate, for example about 800 gallons per minute.

The solution in tank 24 is maintained at the desired temperature by means of a hot plate 35 on the bottom of the tank, having a steam inlet pipe 36 at one end and a suitable steam trap 37 adjacent the other end, the temperature being regulated by a suitable temperature controller 38 which controls the flow of steam to the hot plate. A small portion of the liquid in tank 24 is continuously withdrawn from the tank, heated and then returned to the tank by means similar to the apparatus described above in connection with Fig. 1, corresponding parts being indicated by similar reference characters in Figs. 1 and 2. The fruit are propelled through tank 24 of Fig. 2 by the paddles 26 and are carried out of the tank by the elevator or conveyor 40.

Figure 3:
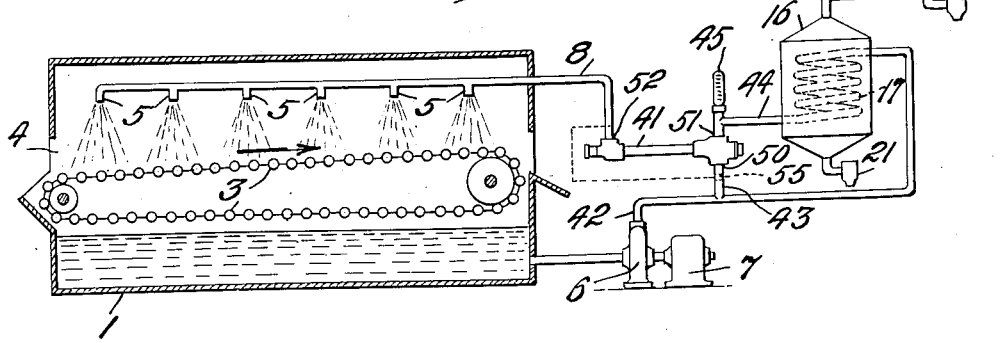
Fig. 3 shows a machine of the "spray" type in which all the heating of the coloring or other liquid is accomplished under controlled conditions outside the tank.

Fig. 3 shows a machine of the "spray" type which is similar to that shown in Fig. 1 except that all of the heat required by the tank is supplied by the external heater 16. The operation of this machine is generally similar to that shown in Fig. 1 and the corresponding parts are identified by similar reference characters in these two views. In order to maintain a constant temperature in the tank 1 of Fig. 3, for example a temperature of 135° F. which is the usual temperature used in machines of this type, I employ a suitable temperature controller 41 whereby part of the relatively cold liquid from tank 1, emerging from the tank through pipe 42, divides and enters the controller 41 through branch pipe 43 and thereby mixes with the liquid coming from the heater 16 through pipe 44. The liquid entering controller 41 through pipe 44 is maintained at a constant temperature, for example 220 to 240° F., this temperature being indicated by a thermometer 45 inserted in pipe 44. The controller 41 serves to blend the relatively cold water from pipe 42 entering the controller through pipe 43 with the hot water entering the controller through pipe 44, so that the temperature of the blended liquid emerging from controller 41 into spray pipe 8 is maintained at a constant uniform level, for example 135° F.

The temperature controller 41 may be of any suitable construction, such as that shown in Fig. 6 which illustrates a "Sarco" water blender. This device employs an element 47 containing a mineral oil which expands when heated, thereby pushing the stem 48 toward the right as viewed in Fig. 6. This regulates the position of valve plunger 49, thus varying the proportion of cold and hot liquid entering the valve at the inlets 50 and 51 which are connected, respectively, to the pipes 43 and 44 of the apparatus shown in Fig. 3. The blended liquid at the desired temperature is delivered at outlet 52 which is connected to the spray pipe 8 in Fig. 3. The thermostat 47 may be adjusted as desired by turning the screw 53, the relief spring 54 being provided to prevent damage to the themostat from over-expansion. It will thus be seen that, regardless of the temperature of the liquid in tank 1 of Fig. 3, the controller 41 will maintain a constant temperature of the liquid in spray pipe 8 by reason of the mixing, in the proper proportion, of the liquid from pump 6 at tank temperature with the hot liquid from the heater 16.

Instead of employing the temperature controller 41 in Fig. 3 the temperature may be regulated by means of a suitable reverse acting valve 55 which may be inserted in pipe 43 and controlled by a thermostatic bulb in spray pipe 8 as indicated in dotted lines in Fig. 3. In such case the thermostatic bulb would cause the bypass valve 55 to open when the temperature rose too high and close when it dropped too low. A by-pass valve such as 55, of course, performs the same function as the controller or blender 41 since it blends the low temperature liquid coming from pump 6 with the high temperature liquid coming from heater 16. The thermostatic control valve could be installed directly in the tank 1 of Fig. 3 insted of in spray pipe 8, if desired. However, the preferred position of the control bulb is in pipe 8 since with this arrangement the temperature of the liquid is instantly brought to the desired point even though the tank itself may be quite cold and below the operating temperature, whereas if the bulb is placed in the tank the apparatus would have to be operated for several minutes before the fruit started through the machine. In the latter case the temperature of the spray liquid would always be higher than the temperature of the tank liquid, and the temperature of the liquid would be determined by the temperature of the liquid leaving the fruit rather than by the temperature of the liquid applied to the fruit.

Fig. 4 shows a machine of the "submerger" type which is similar to that described above in connection with Fig. 2 except that all the heat supplied to tank 24 is derived from the heater 16, the temperature being maintained at any desired point by a temperature controller and associated means similar to those illustrated in Figs. 3 and 6. In Fig. 4 the circulation of the liquid in the submerger tank 24 is maintained by the propeller 33 which creates a flow of about 800 gallons per minute, while the amount of liquid withdrawn from the tank by pump 6 may not exceed 20 gallons per minute. Therefore, the mixture of the boiling liquid at a temperature of say 240° F., entering the tank through pipe 56, and mixing with the liquid in the tank as it passes through propeller 33, will only raise the temperature of the liquid in the tank one or two degrees, so that the liquid withdrawn from the tank through outlet pipe 57 will be at a temperature approximately equal to the average temperature of the entire tank, as will be indicated by the thermometer 58 in pipe 57. Therefore the temperature controller or blender 41, connected in the circulating system as illustrated in Fig. 4, will control the temperature of the tank because any change in the temperature of the tank will vary the opening of the valve in controller 41 so as to by-pass part of the liquid from the pump 6 through pipe 59, while part of this liquid will pass through pipe 60 to the heater coil 17. From heater coil 17 this liquid will pass out through pipe 61, over thermometer 62 which will indicate the temperature of the liquid leaving the heater, so that the operator will be able to tell at a glance if the temperature is at the desired point, for example 240° F. The liquid from pipe 61 and pipe 59 will mix together in pipe 56 and then enter the tank 24, mixing with the liquid in the tank as it passes over the propeller 33. In this way a maximum flow of liquid to the heater 16 can be maintained because all of the heat supplied to the liquid will be supplied by the heater 16. The temperature controller or blender 41 of Fig. 4 may be replaced by a reverse acting valve similar to the valve 55 described in connection with Fig. 3, although in Fig. 4 the valve would be installed in pipe 59 and the thermostatic bulb would be mounted either in pipe 57 or in the tank 24.

Fig. 5 shows the application of a heat exchanger to the system to increase the amount of liquid which is passed through the heater 16 and thereby increase the effect of the heater on reconditioning the fruit treating bath. The general arrangement of this system is similar to that described above in connection with Fig. 4, and similar reference characters are used to indicate the corresponding parts in these views. The liquid is withdrawn from the tank 24 of Fig. 5 through pipe 64 by pump 6 and is pumped through the temperature controller or blender 41. When the tank is cold the controller 41 will force all of the liquid through pipe 65 into the outer pipe 66 of heat exchanger 67 and the liquid will flow through the heat exchanger as indicated by the arrows into pipe 68 and thence into the heating coil 17 of heater 16. This liquid will flow out of the heater through pipe 69 containing a suitable thermometer 70 to indicate to the operator that the liquid from the heater 16 is being maintained at a proper temperature, preferably 220° F. or higher. This liquid then passes through the inner pipe 71 of the heat exchanger and thence through the pipes 72 and 73 to tank 24.

When the tank 24 of Fig. 5 gets up to temperature the controller or blender 41 will open its valve and part of the liquid from pump 6 will pass through pipe 75 and mix with the liquid coming from pipe 72. This liquid in the pipe 75 will be at the same temperature as the liquid in tank 24 and it will therefore have no effect on the heating of the tank. All of the heating will be accomplished by the liquid flowing through the pipe 72, and, due to the effect of the heat exchanger 67 on this liquid, the liquid in pipe 72 will be at a lower temperature than the liquid in pipe 69. It will therefore require more liquid flowing through the pipe 72, and consequently more liquid flowing through heater 16, to maintain the temperature in tank 24. It will be readily seen, therefore, that the larger the heat exchanger 67, the larger will be the amount of liquid necessary to flow through heater 16 to maintain the temperature in tank 24, which temperature will usually be in the neighborhood of 110 to 120° F.

In the system of Fig. 5 a by-pass valve 76 is preferably connected between pipes 69 and 72 to short-circuit the heat exchanger when necessary or desirable. The valve 76 is ordinarily kept closed, but if the fruit happen to be extremely cold it would be difficult to maintain the proper temperature in the tank with the size of heater usually employed in machines of this type, and in such cases the valve 76 can be opened so as to by-pass the heat exchanger and thereby increase the heating capacity of the system. The temperature controller 41 of Fig. 5 may also be replaced by an automatically controlled by-pass valve similar to the valve 55 described in connection with Fig. 3, such valve being installed in pipe 75 while the thermostatic control bulb would be mounted either in the pipe 64 or in the tank 24 of Fig. 5.

Figure 7:
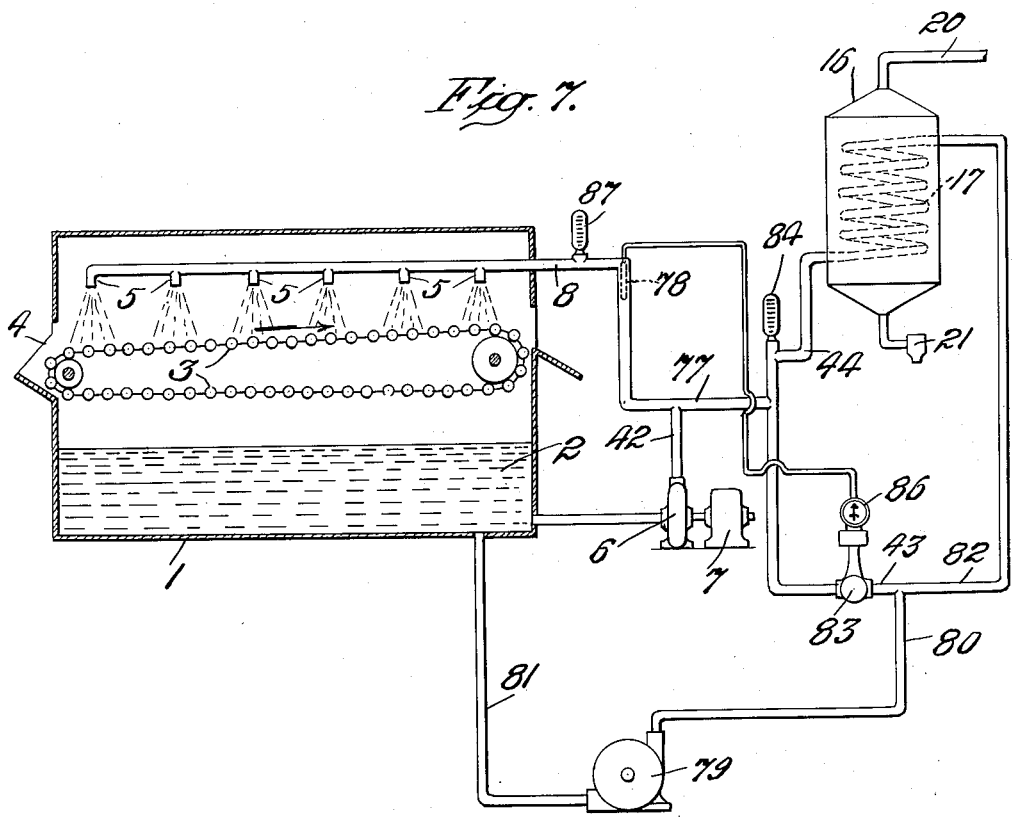
Fig. 7 shows a machine similar to that of Fig. 1 but embodying still another feature of the invention.

Fig. 7 shows another modification of the "spray" type machine illustrated in Figs. 1 and 3. In a machine of this type it is desirable that the amount of liquid delivered to the spray nozzles be very large, for example 200 or 300 gallons per minute. However, it would require considerable pressure to pump such an amount of liquid through the coil 17 of heater 16, and, therefore, it would place a heavy burden on the pump to force the liquid against this high pressure. This difficulty is avoided by employing a combination of small and large pumps as illustrated in Fig. 7. In this embodiment of the invention the pump 6, driven by motor 7, pumps a large quantity of liquid, possibly 300 gallons per minute, through pipe 42 into pipe 77, where it mixes with the liquid from heater coil 17, and thence to the spray pipe 8.

The pump 79 draws liquid through pipe 81 from tank 1, and through pipe 80, and discharges it into pipes 82 and 43. When the temperature of the liquid flowing in spray pipe 8 is low, by reason of the operation of pump 6, a thermostatic bulb 78 inserted in this pipe causes valve 83 in pipe 43 to be closed, the valve 83 being a reverse-acting valve which closes when the temperature of the liquid in pipe 8 is low. This condition forces all of the liquid from pump 79 through pipe 82 and heater coil 17, then out through pipe 44 and past thermometer 84, into pipe 77, at which point it mixes with the liquid from pipe 42 and raises the temperature of the liquid in spray pipe 8. As the temperature of the liquid rises, due to mixing with the hot liquid from pipe 44, the valve 83 gradually opens, allowing part of the liquid from pump 79 to pass directly into pipe 77 and thereby partially cool the liquid coming from pipe 44, so that the temperature of the liquid in pipe 8 is maintained at the desired point.

The control valve 83 may be provided with a dial indicating thermometer 86 which is controlled by the temperature of a suitable bulb acting on this dial to move the hand and thereby indicate the temperature of the liquid in pipe 77. If control valve 83 is not equipped with a thermometer of the dial type, then a thermometer 87 may be installed in pipe 8 in order to make sure that the liquid sprayed on the fruit is at the correct temperature.

The system shown in Fig. 7 effects a decrease in power consumption, because the pump 6 operated by motor 7 can be operated at a much lower head than would be necessary if part of this liquid were forced through the heater. For example, pump 6 could have a capacity of 300 gallons per minute while pump 79 might have a capacity of 25 gallons per minute. The pump 6 would be operating against a total head of 10′, including friction in the pipe lines and in the spray nozzles, while pump 79 would be operating at perhaps 50′ or 60′ head, pumping about 25 gallons per minute and thereby requiring perhaps ¾ horsepower, while pump 6 operating at the stated low head would operate with perhaps a 1½ or 2 horsepower motor. If pump 6 had to be operated against a 50′ or 60′ head, in order to force the liquid through heating coil 17, it would require 7½ to 10 horsepower to drive this pump. The arrangement of Fig. 7 therefore effects a substantial saving in the cost of operation.

It may be noted that the tank used in a "spray" type machine such as shown in Figs. 1, 3 and 7 can be relatively small and the liquid brought to this tank by means of a drip pan arranged to catch the liquid dropping off the roller belt and returning it to the tank. Such arrangement makes it possible to use a relatively small tank and results in an increased efficiency in the circulating system because a larger percentage of the total solution would go through the heater and thereby keep the solution in better condition as regards the dye crystals. For this reason it is not so necessary or desirable to use a heat exchanger in a "spray" machine of the type shown in Figs. 1, 3 and 7, as it is to use such a heat exchanger in connection with the machines shown in Figs. 2, 4 and 5. In "submerger" machines of the type shown in Figs. 2, 4 and 5 the amount of liquid in the tank is much larger than in machines of the "spray" type, and with such large tanks it is important to pass as large a percentage of liquid or dye solution as possible through the heater, and this may be accomplished to advantage with a heat exchanger of the type shown in Fig. 5.

It is also to be noted that in applying my invention to a machine of the "submerger" type shown in Figs. 2, 4 and 5 it is possible to operate satisfactorily without blending the cold liquid with the hot liquid coming from the heater; in other words, the hot liquid from the heater may be discharged directly into the tank and the cold liquid from the blender may be discharged back into the tank or into the suction side of the pump, and accomplish the same results as are described above. For example, the pipe 59 in Fig. 4 and the pipe 75 in Fig. 5 may be arranged to discharge directly into the tank or into the suction side of the pump, with the same result as previously described.

I have illustrated and described certain specific embodiments of my invention for purposes of illustration, but it will be understood that various changes may be made in the foregoing details of construction and methods of operation without departing from the scope and sprirt of the invention as defined in the appended claims.

The invention claimed is:

1. Method of sterilizing the liquid in a fruit treating tank while maintaining the contents of the tank below a sterilizing temperature, which comprises repeatedly withdrawing small amounts of liquid from said tank, heating the liquid so withdrawn to a temperature high enough to destroy decay spores contained therein, and returning the heated liquid to said tank wherein it is cooled by contact with the liquid in said tank.

2. Method of sterilizing the liquid in a fruit treating tank while maintaining the contents of the tank below a sterilizing temperature, which comprises repeatedly withdrawing small amounts of liquid from said tank, heating the liquid so withdrawn to a temperature high enough to destroy decay spores contained therein, and returning the heated liquid to said tank at a rate adapted to maintain a predetermined constant temperature therein.

3. Method of sterilizing the liquid in a fruit treating tank while maintaining the contents of the tank below a sterilizing temperature, which comprises withdrawing the liquid from said tank in relatively small amounts, heating at least a portion of the liquid so withdrawn to a temperature high enough to destroy decay spores contained therein, mixing the heated liquid with unheated liquid as withdrawn from said tank according to the temperature of the liquid in said tank, and returning said mixed liquids to said tank.

4. Method of returning large dye crystals into solution in the dyeing liquid in a fruit coloring tank, which comprises heating the contents of said tank to a temperature well below the boiling point but high enough to permit efficient transfer of dye from the liquid to the fruit, withdrawing the liquid from said tank in relatively small amounts, heating the liquid so withdrawn to a temperature well above that of said tank and high enough to break up the large dye crystals contained therein, and returning the heated liquid to said tank and thereby quickly cooling same by contact with the liquid in said tank to the temperature of said tank out of direct contact with the fruit.

5. Method of returning large dye crystals into solution in the dyeing liquid in a fruit coloring tank and sterilizing the liquid, which comprises heating the contents of said tank to a temperature well below the boiling point but high enough to permit efficient transfer of dye from the liquid to the fruit and to destroy decay spores, withdrawing the liquid from said tank in relatively small amounts, heating the liquid so withdrawn to a temperature in the neighborhood of the boiling point, and returning the heated liquid to said tank out of direct contact with the fruit to thereby quickly cool same by contact with the liquid in said tank to the temperature of said tank.

6. Method of returning large dye crystals into solution in the dyeing liquid in a fruit coloring tank, which comprises heating the contents of said tank to a temperature well below the boiling point but high enough to permit efficient transfer of dye from the liquid to the fruit, continuously withdrawing small amounts of liquid from said tank, heating the liquid so withdrawn to a temperature of 190 to 240° F., and continuously returning the heated liquid to said tank out of direct contact with the fruit to thereby cool same quickly by contact with the liquid in said tank to the temperature of said tank.

7. Method of returning large dye crystals into solution in the dyeing liquid in a fruit coloring tank and sterilizing the liquid, which comprises withdrawing the liquid from said tank in relatively small amounts, heating the liquid so withdrawn to a temperature in the neighborhood of the boiling point, and returning the heated liquid to said tank out of direct contact with the fruit under conditions to cool the heated liquid quickly by contact with the liquid in said tank and to maintain the liquid in said tank at a predetermined temperature considerably below the boiling point.

8. Method of returning large dye crystals into solution in the dyeing liquid in a fruit coloring tank and sterilizing the liquid, which comprises continuously withdrawing small amounts of liquid from said tank, heating the liquid so withdrawn to a temperature in the neighborhood of the boiling point, and continuously returning the heated liquid to said tank out of direct contact with the fruit and in heat-exchanging relationship with the liquid withdrawn from said tank to cool the heated liquid quickly while maintaining the liquid in said tank at a predetermined temperature considerably below the boiling point.

9. The combination with a fruit treating tank adapted to contain a liquid for treating the fruit, of means for withdrawing the liquid from said tank in relatively small amounts, means for heating the liquid withdrawn from said tank, and means for returning the heated liquid to said tank out of direct contact with the fruit therein.

10. The combination with a fruit treating tank adapted to contain a liquid for treating the fruit, of means for withdrawing the liquid from said tank in relatively small amounts, means for heating the liquid withdrawn from said tank, means for returning the heated liquid to said tank out of direct contact with the fruit therein, and means controlled by the temperature of the liquid in said tank for regulating the temperature of the heated liquid returned thereto.

11. The combination with a fruit treating tank adapted to contain a liquid for treating the fruit, of means for withdrawing the liquid from said tank in relatively small amounts, means for heating at least a portion of the liquid withdrawn from said tank, means controlled by the temperature of the liquid withdrawn from said tank for mixing a portion of said liquid with the heated liquid, and means for returning the mixed liquid to said tank out of direct contact with the fruit therein.

12. The combination with a fruit treating tank adapted to contain a liquid for treating the fruit, of a circulating system comprising an outlet pipe for withdrawing liquid from said tank, a heater connected to said outlet pipe, a return pipe communicating with said tank at a point remote from the path of the fruit therein, and a liquid blender adapted to receive liquid from said outlet pipe and from said heater and to deliver liquid to said return pipe, said blender being responsive to changes in the temperature of the liquid therein to regulate the relative amounts of liquid received from said tank and from said heater.

13. The combination with a fruit treating tank adapted to contain a liquid for treating the fruit, of a circulating system comprising an outlet pipe for withdrawing liquid from said tank, a heater connected to said outlet pipe, a return pipe connecting said heater to said tank at a point remote from the path of the fruit therein, and means controlled by the temperature of the liquid in said tank to by-pass liquid from said outlet pipe to said return pipe to control the temperature of the liquid returned to said tank.

14. The combination with a fruit treating tank adapted to contain a liquid for treating the fruit, of a circulating system comprising an outlet pipe for withdrawing liquid from said tank, a liquid blender connected to said outlet pipe, a heater connected to said blender to receive liquid therefrom, a return pipe from said heater connected to said blender and to said tank at a point remote from the path of the fruit therein, and means associated with said blender and controlled by the temperature of the liquid therein for regulating the flow of liquid from said blender to said heater and to said return pipe.

15. The combination with a fruit treating tank adapted to contain a liquid for treating the fruit, of a circulating system comprising an outlet pipe for withdrawing liquid from said tank, a liquid blender connected to said outlet pipe, a heater connected to said blender to receive liquid therefrom, a return pipe from said heater connected to said blender and to said tank at a point remote from the path of the fruit therein, means for passing the liquid flowing to and from said heater in heat-exchanging relationship, and means associated with said blender and controlled by the temperature of the liquid therein for regulating the flow of liquid from said blender to said heater and to said return pipe.

BRONSON C. SKINNER.